United States Patent
Bernsmeier et al.

(10) Patent No.: US 12,315,938 B2
(45) Date of Patent: May 27, 2025

(54) METHOD FOR PRODUCING CATALYST-COATED MEMBRANES

(71) Applicant: TECHNISCHE UNIVERSITÄT BERLIN, Berlin (DE)

(72) Inventors: Denis Bernsmeier, Berlin (DE); Ralph Krahnert, Berlin (DE); Michael Bernicke, Berlin (DE); Benjamin Paul, Berlin (DE)

(73) Assignee: TECHNISCHE UNIVERSITÄT BERLIN, Berlin (DE)

( * ) Notice: Subject to any disclaimer, the term of this patent is extended or adjusted under 35 U.S.C. 154(b) by 92 days.

(21) Appl. No.: 18/247,009

(22) PCT Filed: Sep. 29, 2021

(86) PCT No.: PCT/EP2021/076742
§ 371 (c)(1),
(2) Date: Mar. 28, 2023

(87) PCT Pub. No.: WO2022/069515
PCT Pub. Date: Apr. 7, 2022

(65) Prior Publication Data
US 2023/0361315 A1    Nov. 9, 2023

(30) Foreign Application Priority Data

Sep. 29, 2020 (EP) .................................... 20198923

(51) Int. Cl.
| | |
|---|---|
| *H01M 4/86* | (2006.01) |
| *C25B 11/031* | (2021.01) |
| *C25B 11/051* | (2021.01) |
| *C25B 13/08* | (2006.01) |
| *H01M 4/88* | (2006.01) |

(52) U.S. Cl.
CPC ......... *H01M 4/8605* (2013.01); *C25B 11/031* (2021.01); *C25B 11/051* (2021.01); *C25B 13/08* (2013.01); *H01M 4/8814* (2013.01); *H01M 4/8842* (2013.01)

(58) Field of Classification Search
CPC ............. H01M 4/8605; H01M 4/8814; H01M 4/8842; C25B 11/031; C25B 11/051
See application file for complete search history.

(56) References Cited

U.S. PATENT DOCUMENTS

| | | | |
|---|---|---|---|
| 2007/0023289 A1* | 2/2007 | Miyata | H01S 5/10 204/515 |
| 2007/0166226 A1* | 7/2007 | Holmes | B01J 29/0308 423/659 |
| 2010/0119809 A1* | 5/2010 | Yano | C01B 33/12 428/312.6 |
| 2010/0183804 A1 | 7/2010 | Kim et al. | |
| 2016/0293343 A1* | 10/2016 | Dwyer | H01G 9/2027 |
| 2018/0323459 A1* | 11/2018 | Zou | H01M 8/1004 |
| 2018/0351155 A1* | 12/2018 | Tolbert | B01J 23/78 |

FOREIGN PATENT DOCUMENTS

| | | | | |
|---|---|---|---|---|
| EP | 3229303 A1 | 10/2017 | | |
| JP | 2002-338229 | * 11/2002 | ............. | C01B 33/12 |
| JP | 2016-173293 A | * 9/2016 | ............. | G01N 27/30 |

OTHER PUBLICATIONS

Soboleva, Tatyana, et al., "PEMFC Catalyst Layers: The Role of Micropores and Mesopores on Water Sorption and Fuel Cell Activity". ACS Appl. Mater. Interfaces 2011, 3, 1827-1837.*
Sun, Chunwen, et al., "Investigations of mesoporous CeO2—Ru as a reforming catalyst layer for solid oxide fuel cells". Electrochemistry Communications 8 (2006) 833-838.*
Kim, Hee-Tak, et al., "Cathode catalyst layer using supported Pt catalyst on ordered mesoporous carbon for direct methanol fuel cell". Journal of Power Sources 180 (2008) 724-732.*
Paul, Michael T.Y., et al., "Mesoporous Platinum Prepared by Electrodeposition for Ultralow Loading Proton Exchange Membrane Fuel Cells". Scientific Reports (2019) 9:4161, pp. 1-9.*
International Search Report and Written Opinion issued in PCT application No. PCT/EP2021/076742, mailing date Oct. 29, 2021.

* cited by examiner

*Primary Examiner* — Bret P Chen
(74) *Attorney, Agent, or Firm* — Benesch Friedlander Coplan & Aronoff LLP

(57) ABSTRACT

A method for producing a catalyst-coated polymer membrane for an electrolyser and/or a fuel cell includes steps including providing a glass-ceramic substrate and synthesizing a mesoporous catalyst layer on the glass-ceramic substrate. The steps include pressing a polymer membrane onto the glass-ceramic substrate coated with the catalyst layer at a first temperature $T_1$, thereby producing a sandwich structure. The steps further include separating the sandwich structure. The catalyst layer is separated from the glass-ceramic substrate and adheres to the polymer membrane.

19 Claims, 6 Drawing Sheets

A) Synthesis of a mesoporous catalyst layer

B) Transfer of the mesopore catalyst layer on an ionomer membrane

A) Photographic images before a hot-press process

Mesoporous RuOx film on vitreous carbon

Naphion membrane

Nafion membrane on mesoporous RuOx film on glassy carbon

B) Photographic images according to a hot-press process

Mesoporous RuOx film on a vitreous carbon by hot-press process

RuOx film on Nafion membrane

SEM representation from above

On glass carbon

Transferred
mesoporous RuO$_x$
film on membrane

SEM representation on
mesoporous RuO$_x$ before and
after transfer to a membrane ii) Mesoporous IrO$_x$ film on Nafion membrane via transfer method i) Commercial IrO$_x$ film on Nafion membrane via ink coating Photographic representation SEM representation

METHOD FOR PRODUCING CATALYST-COATED MEMBRANES

TECHNICAL FIELD

The invention relates to a method for producing a catalyst-coated polymer membrane for an electrolyser and/or a fuel cell. In a first step, the method preferably comprises the provision of a glass-ceramic substrate. A mesoporous catalyst layer is then preferably synthesized on the glass-ceramic substrate. In a next step, a polymer membrane is preferably pressed onto the glass-ceramic substrate coated with the catalyst layer at a first temperature $T_1$. This results in a sandwich structure. In a final process step, the sandwich structure is separated, the catalyst layer being separated from the glass-ceramic substrate and adhering to the polymer membrane.

In addition, the invention relates to a polymer membrane which has been produced by the process of the type mentioned at the outset, and to an electrolyser or a fuel cell having such a polymer membrane.

BACKGROUND AND STATE OF THE ART

Fuel cells and electrolysis cells consist of electrodes which are separated from one another by an electrolyte (ion conductor). The electrolyte may consist of a semipermeable membrane which is permeable only to one type of ion, for example protons. In electrolyser cells and fuel cells with proton-conducting membranes (PEM), catalyst-coated gas diffusion layers (CCG) are used in addition to catalyst-coated membranes (CCM), also known as membrane-electrode assemblies (MEAs).

To produce a catalyst-coated membrane, electrocatalytically active catalyst layers are applied to proton-conducting membranes (Nafion, Aquivion). These are usually contacted with gas diffusion layers and mounted in a cell.

Furthermore, processes are known from the prior art (U.S. Pat. No. 7,972,743 B2 and JP 2003211063 A) which make it possible to apply catalyst layers to a membrane by means of direct coating processes (blading, screen printing or spraying processes). For these processes, catalysts are dispersed with an ionomer, which acts as an ion conductor and binder, to form an ink and applied to the membrane.

The production of a catalyst-coated membrane on the basis of a coating known from the prior art, in particular a homogeneous spray coating, is disadvantageously time-consuming and cannot be reproduced in a manual preparation. Although production with a robot, preferably a spray robot, leads to more uniform results, it is cost-intensive.

In addition, indirect methods for applying a catalyst layer to a membrane are known.

The publication US20020136940 A1 discloses, for example, a so-called decal method. Therein, a catalyst is applied to a transfer medium (Teflon) and transferred from this transfer medium via a hot pressing step to the ion-conducting membrane.

Documents U.S. Pat. Nos. 5,879,828 A and 6,040,077 A likewise disclose an indirect method in which a polymer (polyimide) substrate is used as the transfer medium. The catalyst material is applied to the transfer medium in the disclosures and then pressed onto a Nafion membrane. The product obtained is a membrane comprising a catalyst layer.

US 2018/323459 A1 discloses a method for producing a catalyst-coated membrane assembly for a solid polymer electrolyte fuel cell. In this case, a cathode catalyst paint (usually also referred to as "ink") is applied to a carrier medium and then dried, as a result of which a cathode catalyst layer is produced on the carrier medium. In a subsequent step, a membrane ionomer solution is applied to the surface of the cathode catalyst layer. While the coating of ionomer solution is still wet, a layer of e-PTFE (expanded PTFE) is applied to the surface of the coated ionomer solution in a wet lamination step. This structure is then dried and annealed via a drying and annealing step, the production of the e-PTFE-reinforced electrolyte membrane being completed. Subsequently, the anode catalyst ink is applied to the surface of the section of the e-PTFE layer via the web coating step. As before, this coating is dried in one drying step. Finally, the carrier medium is peeled off in a removal step.

The cathode catalyst paint used (usually also referred to as "ink") generally comprises a binder. Although a high proton conductivity can be achieved by means of a binder, the electrical conductivity of the catalyst layer is simultaneously reduced and catalytically active centres are blocked. In "ink"-based routes, the binder is usually added in excess in order to achieve sufficient mechanical strength or structural integrity, the setting of an optimum between electrical conductivity and proton conductivity not being accessible.

The known processes (both direct and indirect processes) for the production of a catalyst coating membrane furthermore disadvantageously do not make possible any nanostructured mesoporous catalyst layers on polymer membranes. In particular, however, such layers are associated with substantial advantages. It has been found that, on a half-cell scale, mesoporous-prepared catalyst layers have a significantly higher mass activity of the electrochemically active species than comparable conventional catalyst layers which have been produced, for example, by an ink-based method.

The use of nanostructured mesoporous catalyst layers on polymer membranes in a real environment is not known from the prior art.

OBJECTIVE OF THE INVENTION

The object of the invention was therefore to eliminate the disadvantages of the prior art and to provide a polymer membrane with a nanostructured mesoporous catalyst layer and, in particular, a method for producing such a polymer membrane.

SUMMARY OF THE INVENTION

The task is achieved by the features of the independent claims. The task according to the invention is solved by the features of the independent claims.

In a preferred embodiment, the invention relates to a method for producing a catalyst-coated polymer membrane for an electrolyser and/or a fuel cell, comprising the following steps:
  a) Providing a glass-ceramic substrate;
  b) Synthesis of a mesoporous catalyst layer on the glass-ceramic substrate;
  c) Pressing a polymer membrane onto the glass-ceramic substrate coated with the catalyst layer at a first temperature $T_1$, thereby producing a sandwich structure;
  d) Separating the sandwich structure, wherein the catalyst layer is separated from the glass-ceramic substrate and adheres to the polymer membrane.

In order to convert highly efficient catalyst layers (nanostructured mesoporous catalyst layers) into a PEM electrolyser, a process had to be developed which enables a mesoporous layer to be applied to the polymer membrane. The inventors were confronted with various problems in the development of the preferred method and had to solve them by a high degree of inventive considerations.

In this way, the polymer membrane cannot be coated directly with the mesoporous catalyst, since the synthesis of a mesoporous-prepared catalyst layer requires a thermal treatment which would destroy the polymer membrane. It was therefore necessary to find a method of synthesizing an intact catalyst layer and subsequently convert it to the polymer membrane without destruction. Since the catalyst layer has a high porosity, it is also very fragile, so it must be produced on a rigid substrate and thermally treated.

The thermal treatment for the synthesis of a catalyst layer is to be regarded as a substantial departure from the prior art. As described at the outset, no catalyst layers which can be produced by thermal treatment have hitherto been used in the prior art in order to produce a catalyst-coated polymer membrane. On the contrary, the carbon-based substrates of ETFE, FEP, PFA, ECTFE disclosed in the prior art are subject to morphological and textural changes at temperatures in the range from ~200 to 330° C. (melting point: PTFE (327° C.), ET-FE (265-275° C.), FEP (260° C.); PFA (310° C.), ECTFE (220 to 227° C.). Glass-ceramic substrates or silicon, on the other hand, are "stable" at significantly higher temperatures (temperature resistance of glass fibre carbon in inert gas or vacuum: up to 3000° C.). In this respect, glass-ceramic substrates can advantageously be used in comparison with other rigid materials, since a higher temperature range to be used in the thermal treatment for synthesis is possible.

The combination of the present process steps leads to a surprising synergistic effect, which results in the advantageous properties and the associated overall success of the invention, whereby the individual features interact with each other. An important advantage of the process according to the invention is also the extremely fast, reproducible and economical synthesis procedure.

In other words, the invention preferably relates to the pressing of a catalyst layer synthesized on a suitable substrate by thermal treatment onto a polymer membrane. Or more preferably, in other words, the pressing of a mesoporous-templed, binder-free catalyst layer synthesized on a suitable substrate by thermal treatment onto a polymer membrane.

In addition, the substrate to be used had to ensure that the catalyst layer produced can be transferred non-destructively to a membrane. Surprisingly, it has been found that a glass-ceramic substrate is particularly suitable for this purpose. By using a glass-ceramic substrate for the synthesis of an easily detachable, yet stable, mesoporous layer, the layer can advantageously be pressed onto a polymer membrane without the use of a binder. The avoidance of the binder advantageously leads to an increased activity due to better accessibility of active centres in a layer which serves as a catalyst.

For the purposes of the invention, a glass-ceramic substrate is preferably a material which has glass-like and/or ceramic properties. The following properties are preferably to be understood as glass-like;
    can be combined with many other materials without interactions
    can be formed at very high temperatures, but remains dimensionally stable in the cold state
    tolerates relatively high temperatures
    gas-tight Characteristic ceramic properties, on the other hand, are preferred.
    relatively low tensile strength
    brittle behaviour
    high temperature resistance
    low thermal shock resistance
    poor thermal conductivity
    Insolubility in water,
    Poor solubility in acids, bases and salt solutions.

Accordingly, the glass-ceramic substrate advantageously has sufficient structural integrity. In addition, it can withstand thermal treatment in an oxygen-containing atmosphere. Furthermore, on the one hand, mechanical adhesion of the synthesized catalyst layer is advantageously ensured and, on the other hand, a redetachment of the layer is nevertheless also made possible.

It is preferred that the substrate to be used also has exclusively glass or ceramic properties.

Other substrates (titanium, silicon, quartz glass) are not suitable, since they have a natural (titanium) or controlled (silicon) thin oxide layer on the surface. If these substrates are now coated, oxygen functions present on the substrate surface can form covalent and/or ionic bonds with the catalyst layer during the thermal treatment, resulting in strong mechanical adhesion. This strong adhesion prevents transfer of the catalyst layer after the pressing process.

Teflon is also not suitable as a substrate. Among other things, decomposition occurs in Teflon in connection with the temperatures ($T_3$-thermal treatment) necessary for the synthesis of the nanostructured mesoporous catalyst layer, with the formation of health-damaging vapours. The synthesis of a mesoporous catalyst layer on the glass-ceramic substrate, which preferably takes place before the application of the mesoporous catalyst layer on the polymer membrane, advantageously leads to the indirect (transfer) method mentioned at the outset, so that a thermal treatment necessary for the synthesis is made possible. As already explained, the polymer membrane would be destroyed under the influence of high temperatures, so that direct synthesis is eliminated. The indirect method has proven to be a particularly preferred alternative.

After the catalyst layer has been synthesized on the glass-ceramic substrate, a polymer membrane is pressed onto the glass-ceramic substrate coated with the catalyst layer at a first temperature $T_1$. The mesoporous catalyst layer is preferably transferred to a polymer membrane by pressing (at elevated temperature). In the region of the glass transition point of the membrane, the polymer chains contained therein become mobile and can be displaced relative to one another. Depending on temperature, contact pressure and time, the catalyst layer penetrates a certain path length into the membrane. By cooling the membrane, the polymer chains solidify and form a covalent bond with the catalyst layer. The adhesion forces between catalyst and membrane are greater than between catalyst layer and glass-ceramic substrate. In a downstream separation step, the membrane is removed, as a result of which the catalyst layer is separated from the glass-ceramic substrate.

For the purposes of the invention, a sandwich structure is preferably a material bonded composite, which is preferably formed from the polymer membrane, catalyst layer and glass-ceramic substrate. The polymer membrane and the catalyst layer as well as the glass-ceramic substrate are stacked one on top of the other under elevated pressure by means of pressing. However, they can be detached from one another without great expenditure of force, so that a user can detach the sandwich structure from one another, for example with tweezers or small pliers (see FIG. 2). It has been found that the process step of pressing does not destroy the mesoporous structure of the catalyst layer, so that this structure can advantageously be transferred to the polymer membrane.

Nanostructuring is preferably understood to mean the structuring of a solid at the atomic level (on the nanoscale). By targeted modification (implantation) atomic, chemical, etc. mostly near-surface solid properties are changed.

A nanostructured mesoporous catalyst layer is preferably to be understood as an ordered nanostructure of the mesoporous catalyst layer. This means that a catalyst layer is repeatedly (periodically) encompassed in the same way in approximately identical structural elements (for example mesopores with a diameter of 2 to 50 nm) (for example lined up).

The catalyst layer preferably comprises a multiplicity of compounds which exhibit different catalytic activities, in particular for different applications. The process is preferably as generic as possible so that an optimal catalyst can be used.

In a preferred embodiment, the invention relates to a method for producing a catalyst-coated polymer membrane for an electrolyser and/or a fuel cell, comprising the following steps:
a) Providing a glass-ceramic substrate;
b) Synthesis of a catalyst layer which can be produced by thermal treatment on the glass-ceramic substrate, wherein a catalyst precursor is provided;
c) Pressing a polymer membrane onto the glass-ceramic substrate coated with the catalyst layer at a first temperature $T_1$, thereby producing a sandwich structure;
d) Separating the sandwich structure, wherein the catalyst layer is separated from the glass-ceramic substrate and adheres to the polymer membrane.

It has been found that the preferred process can also be used to produce catalyst layers which do not have a mesoporous structure. In particular, it was hitherto not known in the context of the production of a catalyst-coated polymer membrane that a catalyst layer can be produced via a thermal treatment. This makes possible, in particular, catalyst layers which advantageously dispense with the use of a binder.

In a further preferred embodiment, the method is characterized in that the glass-ceramic substrate is a vitreous carbon.

Glass carbon is a synthetic material of pure carbon which combines vitreous ceramic properties with those of graphite and is therefore particularly preferably suitable for use as a glass-ceramic substrate. Nevertheless, it was not foreseeable that the use of such a substrate would lead to a successful production of a mesoporous, preformed catalyst layer on a polymer membrane. The use of vitreous carbon as a substrate in the production of oxide layers (catalyst layers) is unusual for the person skilled in the art, since a thermal treatment at temperatures higher than 300° C. and an oxygen-containing atmosphere is required. Furthermore, the use of vitreous carbon as a transfer medium in the hot-press process (pressing at elevated temperature) is unusual since it breaks easily under pressure.

In a further preferred embodiment, substrates with graphitic carbon coatings can preferably be used as glass-ceramic substrates. The carbon in the coating exhibits a behaviour similar to that of the vitreous carbon. Further carbon modifications are also preferably suitable for such coatings.

In a further preferred embodiment, the glass-ceramic substrate has materials and/or coatings which decompose during the thermal treatment. The decomposition (or change in the coating) is preferably low, so that the bond between the template mesoporous catalyst layer and the substrate is weakened but not lost. In the event that the detachment by thermal decomposition of the upper layer of the substrate is not successful, a chemical treatment is also preferably conceivable. Preferably, for example, an etching or detachment of the uppermost substrate layer could be implemented.

In a further preferred embodiment, the method is characterized in that method step c) and method step d) are interspersed with the following method step:
c1) cooling the sandwich structure to a second temperature $T_2$ The cooling is especially important when the sandwich structure has been brought to a temperature that is above the glass transition point of the polymer membrane, because high adhesion forces form between the catalyst layer and the membrane, especially below the glass transition temperature. This leads to the most complete possible (without damage) transfer of the catalyst layer from the glass-ceramic substrate to the polymer membrane.

In a further preferred embodiment, the method is characterized in that method step b) comprises the following steps:
(i) Producing a suspension comprising a template, a metal precursor and a solvent;
(ii) Applying the suspension to the glass-ceramic substrate so that a suspension film forms on the glass-ceramic substrate;
(iii) Drying the suspension film on the glass-ceramic substrate at a temperature $T_4$ so that the solvent is evaporated within the suspension film and a layer of a catalyst precursor having integrated template structures is obtained;
(iv) thermal treatment of the glass-ceramic substrate comprising catalyst precursors at a third temperature $T_3$ and a calcination time $t_3$, so that a mesoporous catalyst layer is formed.

In this connection, a metal salt is preferably dispersed as catalyst precursor together with a template in a suitable solvent and this mixture is transferred to the glass-ceramic substrate. Subsequent evaporation of the solvent leads to an advantageous periodic arrangement of the template surrounded by a catalyst precursor. A subsequent thermal treatment at preferred temperatures between 300° C.-600° C. burns the template and converts the precursor into the actual catalyst, preferably a metal oxide. Removal of the template results in pores which are linked to one another and which particularly advantageously provide a high surface area for catalytic processes.

The synthesis of a catalyst layer can take place exclusively at temperatures $T_3$ above 350° C., since in this temperature range the polymer template is completely removed and the noble metal salt is converted into an oxidic species. For this reason, the customary substrates known from the prior art for use cannot be used. The glass-ceramic substrate, on the other hand, by virtue of its temperature stability, permits precisely such use, it being possible for it to be thermally treated. Accordingly, the advantage of the present invention lies in particular in the fact that, by the coating process (steps (i)-(iii)) on a glass-ceramic substrate and subsequent thermal treatment at >350° C. under air, a binder-free, mesoporous structured catalyst layer is obtained, which can be transferred to a membrane. Although binders which typically consist of nafionic ionomer solutions have the advantage that high proton conductivities are achieved, the electrical conductivity of the catalyst layer is simultaneously reduced and catalytically active centres are blocked. In "ink"-based routes, the binder is usually added in excess in order to achieve sufficient mechanical strength or structural integrity, the setting of an optimum between electrical conductivity and proton conductivity not being accessible. The route proposed in the invention permits the binder-free synthesis of a catalyst layer and opens up the possibility of controlled addition of further ionomers for increasing the proton conductivity without a significant reduction in the electrical conductivity. In addition, nanostructured catalysts are available that have a significantly higher surface/volume ratio than ink-based systems The oxidative decomposition of the uppermost layer of the glass-ceramic substrate leads to an incipient detachment of the adhering catalyst layer. However, the layer continues to hold on to the substrate. This effect is surprising because the person skilled in the art expects complete detachment or decomposition of the oxide layer on the glass-ceramic substrate.

The synthesis on the glass-ceramic substrate is successful since even a short calcination time (preferably 10 minutes) at high temperature (preferably 300° C.-600° C.) is sufficient for the production of active catalyst layer. Long calcination times can lead to degradation of the catalyst layer due to the more detailed decomposition of the supporting glass-ceramic substrate.

The preferred synthesis approach is based on templates which serve as placeholders for a desired pore structure. During the synthesis, the template is enclosed by the surrounding material (catalyst precursor) and, after its removal, leaves a defined porous material. Depending on the template size, pore structures are formed with pore sizes ranging from a few micrometres to a few nanometres. Materials having an ordered pore structure and a monomodal pore size distribution can therefore preferably be synthesized by so-called templating methods. In this synthesis approach, templates serve as placeholders for the desired pore shape.

In further preferred embodiments, the template preferably comprises surfactants, block copolymers and/or dendritic core-shell polymers. The template leads to advantageous mesoporous structuring within the catalyst layer, it being possible for the template to form micelles or else to have other structuring. In further alternatives, the template can also comprise a core-shell macromolecule which does not form micelles, as it were a unimolecular micelle. Furthermore, block copolymers can also assume lamellar structures.

In a preferred embodiment, templates are designed as soft templates. Soft templates are deformable structural directing units. These can be micelles or lamellar structures of amphiphilic polymers (often block copolymers). Typically, the micelles or lamellae are formed above a critical concentration of a polymer dispersed in a solvent. The soft templates also include dendritic or hyperbranched core-shell polymers, the core and shell of the polymers exhibiting different hydrophilicities, thus also being amphiphilic.

In a further preferred embodiment, templates are configured as hard templates. Hard templates are rigid structure-directing units. Nanostructured hard templates include metals, oxides, often silicon oxides (e.g. MCM group, SBA group, FDU group, kit group, MSU group, TUD group, HMM group, FSM group) and also carbons (e.g. CMK group). These hard templates can be individual nanoparticles or nanostructured larger structures.

In a further preferred embodiment, the method is characterized in that method step b) comprises the following steps:
(i) Producing a suspension comprising a metal precursor and a solvent;
(ii) Applying the suspension to the glass-ceramic substrate so that a suspension film forms on the glass-ceramic substrate;
(iii) Drying the suspension film on the glass-ceramic substrate at a temperature $T_4$ so that the solvent is evaporated within the suspension film and a layer of a catalyst precursor having integrated template structures is obtained;
(iv) thermal treatment of the glass-ceramic substrate comprising catalyst precursors at a third temperature $T_3$ and a calcination time $t_3$, so that a catalyst layer is formed.

As already described, catalyst layers which do not have a mesoporous structure can also be produced by the process. In this context, the use of a template can preferably be dispensed with.

In a further preferred embodiment, the process is characterized in that the temperature $T_1$ is in a range between 80° C. and 800° C., preferably in a range between 100° C. and 300° C. and in particular at 120° C.

Pressing at elevated temperatures, preferably in the ranges of 80° C. and 800° C., advantageously permits pressing with low forces, the transfer (from the glass-ceramic substrate to the polymer membrane) of the mesoporous catalyst layer being possible—in spite of the low forces. Elevated temperatures lead to an improved reaction of the various materials in the sandwich structure and allow a complete transfer of the catalyst layer from the glass-ceramic substrate to the polymer membrane. In the range of 100° C. and 300° C., the costs of the energy to be applied are kept relatively low, it being possible to reduce the pressing time to a minimum. The pressing at about 120° C. leads to particularly good reproducible results, so that the process can follow automatically. In addition, a sandwich structure which is particularly easy to separate is obtained. In particular, the temperature of about 120° C. is particularly advantageous for using a Nafion membrane as a polymer membrane, since this has a glass transition temperature at 110° C.

For the application of the pressing force, a manual hydraulic heat press is preferably used, the sandwich structure being heated via two heating plates which are arranged above and below the structure. However, other variants are also possible in order to obtain the pressing force and the preferred temperature $T_1$. Thus, for example, the transfer can take place with one hand of a user, in which the sandwich structure is sufficiently heated, for example, with a hot air stream, a heating plate or an oven, and is subsequently pressed firmly by hand.

Advantageously, the process according to the invention makes it possible to coat or synthesize a mesoporous catalyst layer on a complex structured glass-ceramic substrate. In the course of the present invention, this in turn can serve as a stamp for the formation of patterns (or similar) on the polymer membrane during the transfer of the catalyst layer onto the polymer membrane (in the sandwich structure). Further preferably, the glass-ceramic substrate can also be designed to be very small, so that a pattern can be formed on the membrane in interaction with other glass-ceramic substrates.

All parameter ranges disclosed in this document, such as e.g. Temperatures, forces, pressures, distances, etc., naturally include all values within the specified ranges as well as their maximum and minimum limit values. It is apparent to a person skilled in the art that the values are also subject to certain fluctuations. Accordingly, in the present case the temperature range is about 80° C. and 800° C., and preferably about 100° C. and 300° C. and in particular about 120°

C. This can also be transferred analogously to all other parameter ranges of the document.

Terms such as "substantially", "approximately", "approximately", "approx.", etc., preferably describe a tolerance range of less than ±40%, preferably less than ±20%, particularly preferably less than ±10%, even more preferably less than ±5% and in particular less than ±1% and always include the exact value. "Similar" preferably describes quantities that are "approximately equal". 'Partial' preferably describes at least 5%, particularly preferably at least 10%, and in particular at least 20%, in some cases at least 40%.

In a further preferred embodiment, the process is characterized in that the polymer membrane is pressed onto the glass-ceramic substrate coated with the catalyst layer with a contact pressure $p_1$ in a range from 1000 N/cm$^2$ to 3000 N/cm$^2$ and a time $t_1$ in a range from 5 min to 60 min.

In the described pressure ranges from 1000 N/cm$^2$ to 3000 N/cm$^2$, a short process time can preferably be achieved. In addition, the pressure leads to glass-ceramic substrate not being destroyed, wherein advantageously the pressure enables interaction of the composite partners, so that the mesoporous catalyst layer can form a covalent bond with the polymer chains of the polymer membrane.

In a further preferred embodiment, the process is characterized in that the polymer membrane is pressed onto the glass-ceramic substrate coated with the catalyst layer with a contact pressure $p_1$ in a range from 300 N/cm$^2$ to 10,000 N/cm$^2$ and a time $t_1$ in a range from 5 s to 300 min. The named pressure range in combination with the time range advantageously results in a particularly uniformly pronounced mesoporous catalyst layer.

For the duration of the pressing (until the polymer membrane is separated), the composite of glass-ceramic substrate is present as a sandwich structure.

In a further preferred embodiment, the method is characterized in that the polymer membrane is pressed onto the glass-ceramic substrate coated with the catalyst layer with a contact pressure $p_1$ in a range of about 2000 N/cm$^2$ and a time $t_1$ in a range of about 15 min. The pressing was preferably carried out at a temperature of about 120° C. It has been found that particularly good mesoporous catalyst layers can be applied to polymer membranes by carrying out these parameters. Advantageously, synergistic effects of contact pressure, contact time and contact temperature result, which lead to a particularly long service life of the polymer membrane.

In a further preferred embodiment, the polymer membrane is applied to the glass-ceramic substrate coated with the catalyst layer with a contact pressure $p_1$ of, in particular, about 200 kg/m$^2$.

In a further preferred embodiment, the polymer membrane is carried out on the glass-ceramic substrate coated with the catalyst layer with a time of about $t_1$=15 min.

In a further preferred embodiment, the process is characterized in that the temperature $T_2$ corresponds to a temperature below the glass transition point of the polymer membrane and the temperature $T_4$ is in a range between 18° C. and 80° C.

As soon as the temperature $T_2$ has cooled to a temperature below the glass transition point of the polymer membrane, the sandwich structure can be separated, because by cooling the membrane below the glass transition point, the polymer chains solidify and form a strong bond (due to covalent bonding and/or Van der Waals forces) with the catalyst layer. Since the temperature below the glass point is already sufficient and does not have to be cooled down further, relatively short process times can advantageously be achieved. In addition, no refrigeration units need to be applied to allow for rapid cooling.

In a preferred embodiment, the sandwich structure is spaced apart from the heating plates after the heating pressing, so that the sandwich structure can advantageously cool down rapidly. The temperature $T_2$ is preferably about 50° C.

In the case of a Nafion membrane, the temperature $T_2$ is preferably below 110°. More preferably, the temperature $T_2$ is between 18° C. and 108° C. However, variants in which the temperature $T_2$ is at very low temperatures <0° C. are also conceivable.

The drying of the layer on the glass-carbon substrate can take place in the temperature range from room temperature to 80° C. As a result, only very little energy is advantageously applied. In addition, for such temperatures, the waste heat of the heating systems is sufficient as drying energy to obtain rapid drying of the suspension film. In addition, this leads to large economic savings of the method.

In a preferred embodiment, the thermal treatment takes place in heating systems. For example, a tube furnace in an air stream or a muffle furnace can be used to remove the template. Such furnaces have a uniform temperature distribution, so that the repeatability of the method is advantageously given. Furthermore, the waste heat of the furnaces can advantageously be used for further process steps (for example drying) in order to save energy associated therewith.

In a further preferred embodiment, the thermal treatment can also be carried out by further following methods instead of heating by means of a furnace. Preferably, the glass-ceramic substrate comprising catalyst precursors is thermally treated with the waste heat of a halogen lamp via rapid thermal annealing (RTA). Furthermore, the glass-ceramic substrate comprising catalyst precursors is preferably heated via a flash lamp annealing. This advantageously leads to rapid heating and exclusive heating of the surface. In addition, the laser annealing method is also preferred. This process leads to an even faster heating of the glass-ceramic substrate comprising catalyst precursors, wherein a very low penetration depth is achieved and only the surface is heated. It would be possible to heat a suitable substrate with an induction furnace. This also leads to a very rapid heating.

In a further preferred embodiment, the process is characterized in that the temperature $T_3$ is in a range between 350° C. and 700° C., preferably between 350° C. and 600° C., and the calcining time $t_3$ is in a range between 1 minute and 1440 minutes, in particular 10 minutes.

In order to thermally decompose the template and to convert the inorganic species into a crystalline metal oxide, the catalyst precursor is preferably calcined.

The calcination leads to a drastic volume loss of the layer, caused by burning the template and converting the amorphous pore wall into a crystalline material. Since the adhesion of the layer to the substrate is comparatively strong, inter alia due to covalent bonds between the substrate surface and the metal oxide species, the layer is contracted exclusively perpendicularly to the substrate without the layer tearing.

In a further preferred embodiment, the method is characterized in that the template comprises one or more amphiphilic block copolymers.

Preferred templates for the synthesis of ordered mesoporous solids are amphiphilic molecules. These advantageously form micelles by self-organization and arrange themselves into liquid-crystalline phases. These liquid crystals, with a nanostructuring of typically 2 nm to 50 nm, preferably serve as endotemplate in the synthesis of mesoporous oxides.

In a further preferred embodiment, the glass-ceramic substrate comprising the catalyst precursors is thermally treated in an inert atmosphere. The block copolymer substrates namely also decompose in inert atmospheres at temperatures above 350° C. If the catalyst synthesis is carried out in an inert atmosphere, a further thermal treatment is then preferably carried out in an air atmosphere in order to weaken the bond between the catalyst layer and the glass-ceramic substrate.

For the templating of ordered mesoporous catalyst layers, amphiphilic block copolymers are preferably used, which have a hydrophilic polyethylene oxide (PEO) block In a further preferred embodiment, the method is characterised in that the amphiphilic block copolymer is selected from the group comprising AB-Block Copolymeren (polyethylene oxide-block-polystyrene (PEO-PS), polyethylene oxide-block-polymethyl methacrylate (PEO-PMMA), Poly-2-venlypyridin-block-polyallylmethacrylat (P2VP-PAMA), Polybutadien-block-polyethyleneoxid (PB-PEO), Polyisopren-bock-polydimethylaminoethylmetacrlyt (PI-PDMAEMA), Polybutadien-bock-polydimethylaminoethylmetacrlyt (PB-PDMAEMA), Polyethylen-block-polyethylene oxide (PE-PEO), Polyisobutylen-block-polyethylenoxid (PIB-PEO) and Poly(ethylen-co-buty-len)-block-poly(ethylenoxid) (PEB-PEO), Polystyrol-block-poly (4-vinylpyridin) (PS-P4VP), Polyisopren-block-polyethyleneoxid (PI-PEO), Polydimethoxyanilin-block-polystyrol (PDMA-PS), polyethylene oxide-block-poly-n-utylacrylat (PEO-PBA), Polybutadiene-bock-poly(2-vinylpyridin (PB-P2VP)), polyethylene oxide-block-polylactid (PEO-PLA), polyethylene oxide-block-polyglycolid (PEO-PLGA), polyethylene oxide-block-polycaprolacton (PEO-PCL), Polyethylen-block-polyethylenglycol (PE-PEO), Polystyrol-block-polymethylmetacrlyt (PS-PMMA), Polystyrol-block-polyacrylic acid (PS-PAA), polypyrrol-block-polycaprolacton (PPy-PCL), Polysilicon-block-polyetylenoxid (PDMS-PEO), ABA-Block Copolymeren (polyethylene oxide-block-polybutadien-block-polyethylene oxide (PEO-PB-PEO), polyethylene oxide-block-polypropylenoxid-block-polyethylene oxide (PEO-PPO-PEO), Polypropylenoxid-block-polyethylene oxide-block-polypropylenoxid (PPO-PEO-PPO), polyethylene oxide-block-polyisobutylen-block-polyethylene oxide (PEO-PIB-PEO), polyethylene oxide-block-polybutadien-block-polyethylene oxide (PEO-PB-PEO), Polylactid-block-polyethylene oxide-block-polylactidd (PLA-PEO-PLA), Polyglycolid-block-polyethylene oxide-block-polyglycolid (PGLA-PEO-PGLA), Polylactid-co-caprolacton-block-polyethylene oxide-block-polylactid-co-caprolacton (PLCL-PEO-PLCL), Polycaprolacton-blockpolytetrahydrofuran-blockpolycaprolacton (PCL-PTHF-PCL), Polypropylenoxid-block-polyethylene oxide-block-polypropylenoxid (PPG-PEO-PPG), Polystyrol-block-polybutadien-block-polystyrol (PS-PB-PS), Polystyrol-block-polyethylen-ran-butylen-block-polystyrol (PS-PEB-PS), Polystyrol-block-polyisopren-block-polystyrol (PS-PI-PS), ABC-Block Coplymeren (Polyisopren-block-polystyrol-block-polyethyleneoxid (PI-PS-PEO), Polystyrol-block-Polyvinylpyrrolidon-block-polyethyleneoxid (PS-PVP-PEO), Polystyrol-block-poly-2-venylpyridin-block-polyethylene oxide (PS-P2VP-PEO), Polystyrol-block-poly-2-venylpyridin-block-polyethylene oxide (PS-P2VP-PEO), Polystyrol-block-polyacrylsaure-polyethylene oxide (PS-PAA-PEO)), polyethylene oxide-block-polylactid-block-decan (PEO-PLA-decan), as well as other amphiphilic polymers (polyethylene oxide alkyl ether (PEO-Cxx), e.g. Brij35, Brij56, Brij58) or mixtures thereof, preferably PEO-PB, PEO-PPO, PEO-PB-PEO, PEO-PPO-PEO In a further preferred embodiment, the method is characterised in that one or more metal salts of different metals or their hydrates are used as metal precursor.

In further preferred embodiments, metal nanoparticles can also be used as metal precursor, which can be deposited as a mesoporous-templated layer with the aid of polymer templates. Metal nanoparticles can advantageously be obtained as waste products from industry, if necessary, and can thus be reused in a recycling process.

In a further preferred embodiment, the process is characterised in that the metal salts are selected from the group comprising metal nitrate, metal halide, metal sulphate, metal acetate, metal citrate, metal alkoxide or mixtures thereof.

In alternative embodiments, other salts can also be used provided that they are soluble in a suitable solvent, optionally with the addition of further complexing substances.

In a further preferred embodiment, the process is characterised in that the metals contained in the metal precursor are selected from the group comprising alkali metals, preferably lithium, sodium, potassium, rubidium, caesium, alkaline earth metals, preferably magnesium, calcium, strontium, barium, metals of the third main group of the periodic system, preferably boron, aluminium, indium, gallium, thallium, metals of the fourth main group of the periodic system, preferably tin, silicon, germanium, lead, metals of the fifth main group of the periodic system, preferably bismuth, and transition metals, preferably iridium, ruthenium, cobalt, zinc, copper, manganese, cadmium, vanadium, yttrium, zirconium, scandium, titanium.

In a preferred embodiment, the process is characterised in that ruthenium and/or iridium are used as metal precursor. In particular, these two metals lead to a catalyst layer which has a high stability.

In a further preferred embodiment, the process is characterized in that the solvent used is water or a C1-C4 alcohol, C2-C4 ester, C2-C4 ether, formamide, acetonitrile, acetone, tetrahydrofuran, benzyl, toluene, dimethyl sulfoxide, dichloromethane, chloroform or mixtures thereof, preferably methanol, ethanol, formamide and/or tetrahydrofuran.

The advantages and preferred embodiments of the process according to the invention are to be transferred analogously to the polymer membrane according to the invention, as well as fuel cell or electrolyzer, and vice versa.

In a further preferred embodiment, the invention relates to a polymer membrane for an electrolyser and/or a fuel cell, preferably produced by a process of the type mentioned at the outset, comprising a nanostructured mesoporous catalyst layer.

A polymer membrane comprising a nanostructured mesoporous catalyst layer leads to substantial advantages. Thus, the higher mass activity of the species of a mesoporous catalyst layer has been detected (cf. also FIG. 6).

In a further preferred embodiment, the invention relates to a fuel cell or electrolyser comprising a polymer membrane of the type mentioned at the outset. The use of a polymer membrane according to the invention leads to improved energy production (current generated per milligram of Pt).

The use in PEM electrolysers and fuel cells for the production or regeneration of hydrogen is particularly preferred.

The preferred nanostructured mesoporous polymer membrane according to the invention can preferably also be used in other areas. In medical technology, mesoporous materials are preferably used as active ingredient carriers. Macromolecules are stored in the porous system and can be released over a longer period of time as active ingredient at a suitable location. Here, the targeted adjustability of the porosity and the material is an important factor.

Furthermore, applications of nanostructured mesoporous polymer membranes with respect to a material separation, such as in the context of a filtration or osmosis, are conceivable.

FIGURES

In the following, the invention will be explained in more detail with the aid of figures, without being limited to them.

DETAILED DESCRIPTION OF THE FIGURES

Figure 1:
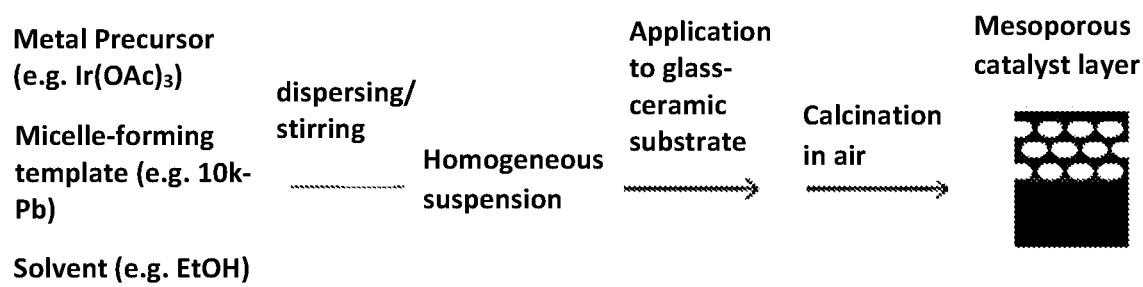
FIG. 1 is a schematic flow diagram of the preferred method for producing a catalyst-coated polymer membrane.
Figure 1:
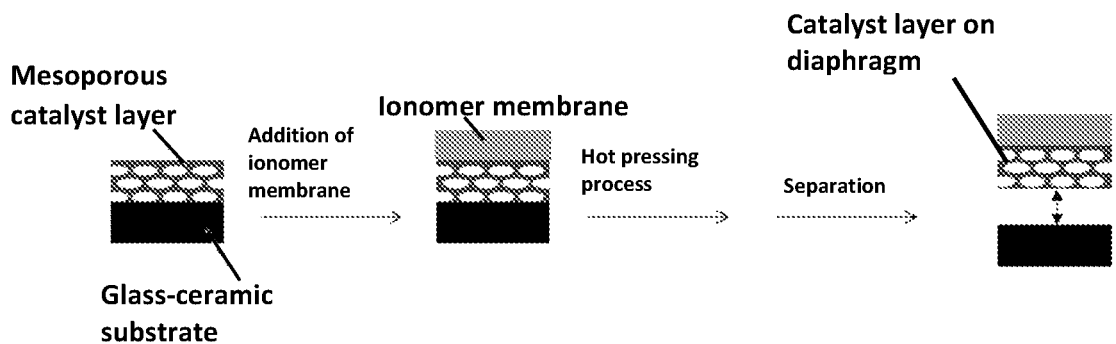

FIG. 1 illustrates, in a schematic flow diagram, a preferred method for producing a catalyst-coated polymer membrane for an electrolyser and/or a fuel cell. The method is preferably to be subdivided into two sequences. On the one hand (outlet A), a mesoporous catalyst layer is synthesized on a glass-ceramic substrate, particularly preferably a vitreous carbon, and on the other hand (outlet B), the mesoporous catalyst layer is transferred to the polymer membrane.

In a first step of run-off A, a homogeneous suspension is prepared, the suspension preferably comprising a metal precursor (for example $Ir(OAc)_3$, a solvent (for example EtOH) and a template forming micelles (for example 10k-Pb; PEO-PB-PEO). In a next step, the suspension is applied to a glass-ceramic substrate, particularly preferably a vitreous carbon, and calcined in air, so that a mesoporous catalyst layer is formed.

In run-off B, a polymer membrane is pressed onto the glass-ceramic substrate with the mesoporous catalyst layer present thereon at an elevated temperature (hot pressing process). Finally, the polymer membrane is separated from the glass-ceramic substrate, the catalyst layer adhering to the polymer membrane.

Figure 2:
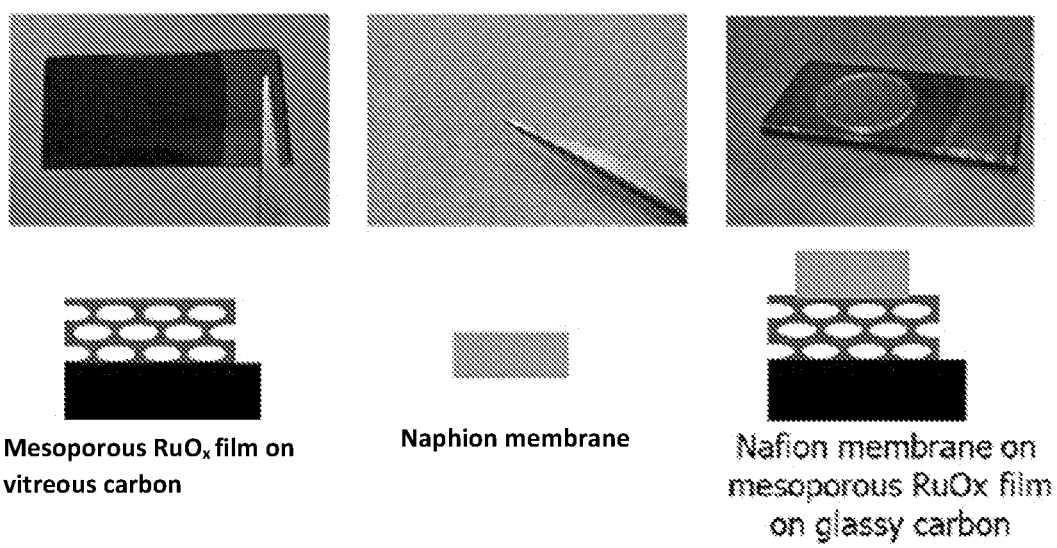
FIG. 2 shows a graph together with schematic sketches before (A) and after (B) the transfer of a mesoporous catalyst layer onto a circular membrane.
Figure 2:
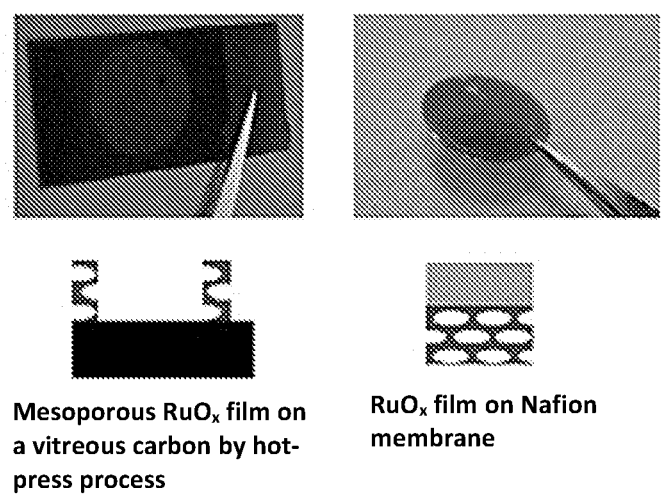

The sequence of representations shown in FIG. 2 shows a preferred sequence of the method for producing a catalyst-coated polymer membrane. In particular, a graphical representation together with schematic sketches before (A) and after (B) of the transfer of a mesoporous catalyst layer to a circular membrane is illustrated. A vitreous carbon is provided with a mesoporous $RuO_x$ catalyst layer. Subsequently, a Nafion membrane is pressed onto the vitreous carbon comprising the catalyst layer, the catalyst layer adhering to the membrane after the separation of the pressed composite.

Figure 3:
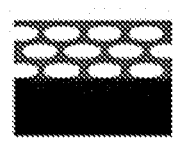
FIG. 3 SEM representation in comparison with a schematic sketch of mesoporous $RuO_x$ layers, at the time before and after a transfer from a glass-ceramic substrate to the polymer membrane.
Figure 3:
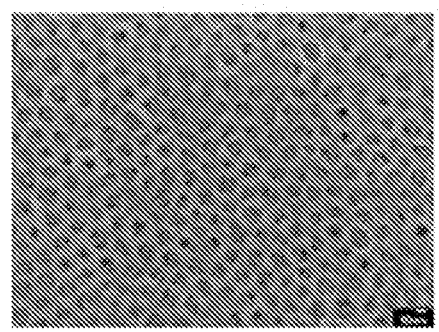
Figure 3:
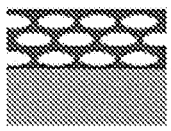
Figure 3:
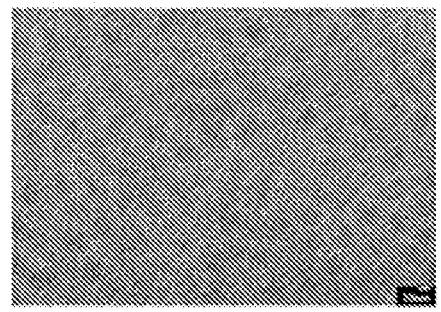

FIG. 3 shows an SEM representation (scanning electron microscope) in a comparison with a schematic sketch of mesoporous $RuO_x$ layers, at the time before and after a transfer from a glass-ceramic substrate to the polymer membrane. FIG. 3 shows the retention of the mesopore morphology during the preferred process sequence, in particular after the transfer of the catalyst layer to the polymer membrane.

Figure 4:
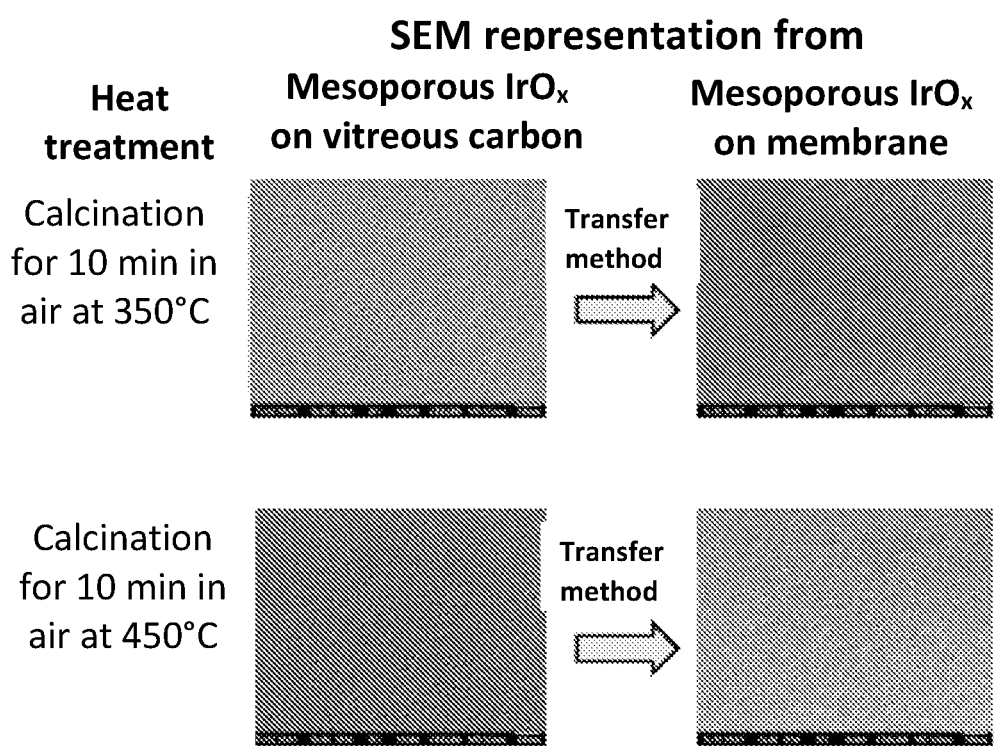
FIG. 4 SEM representation of mesoporous $IrO_x$ layer which have been calcined at different temperatures at the time before and after transfer from a glass-ceramic substrate to the polymer membrane.

FIG. 4 shows an SEM representation of mesoporous IrOx layers which have been calcined at different temperatures at the time before and after transfer from a glass-ceramic substrate to the polymer membrane. The mesopore morphology of the catalyst layer is also maintained at different temperatures.

Figure 5:
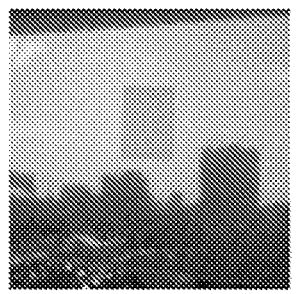
FIG. 5 shows a comparison of a transferred mesoporous $IrO_x$ layer with a conventional $IrO_x$ layer produced on Nafion membranes with similar geometric Ir loads.
Figure 5:
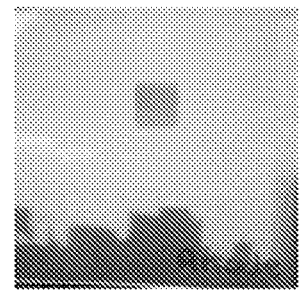
Figure 5:
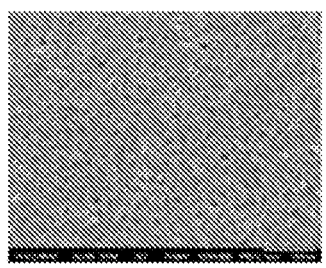
Figure 5:

FIG. 5 shows photographic and SEM images of catalyst layers on membranes. A catalyst-coated membrane produced by a preferred process according to the invention is compared with a catalyst-coated membrane from the prior art. The catalyst-coated membrane (i) having a mesoporous oxide layer prepared by the preferred process according to the invention has ordered mesopores and a nanocrystalline structure. In contrast, the catalyst-coated membrane (ii) produced from an ink by a spraying method does not have a defined nanostructure.

Figure 6:
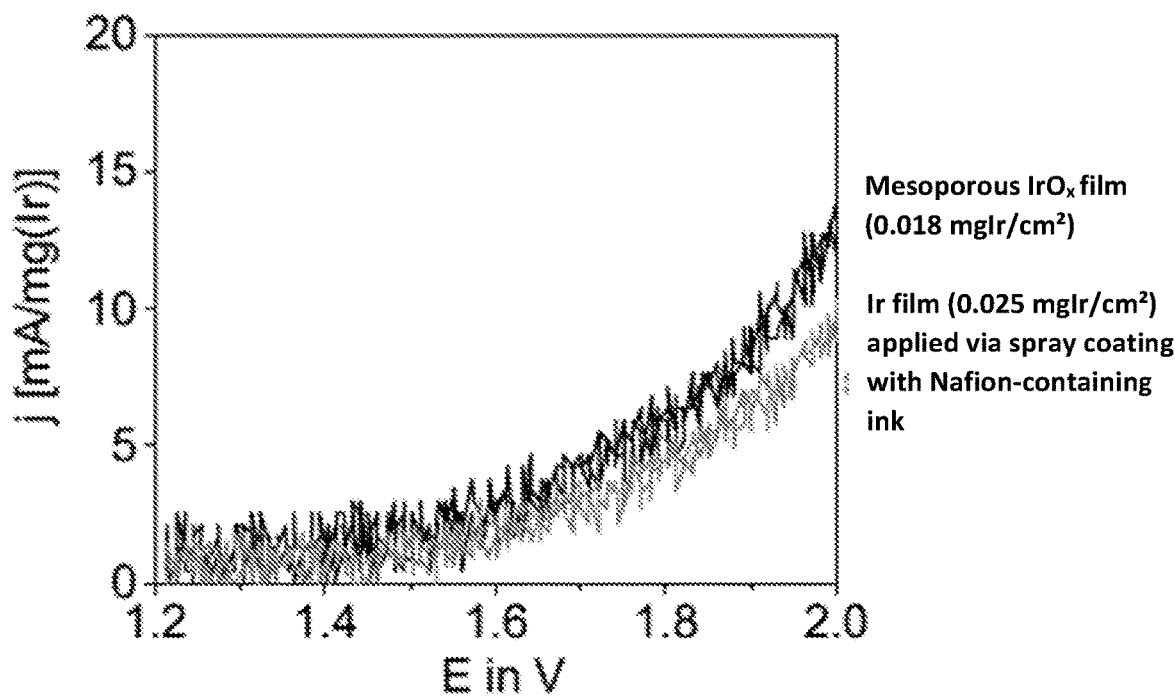
FIG. 6 shows a diagram of the electrocatalytic activity of a catalyst-coated membrane with a templateized mesoporous iridium oxide catalyst produced by the preferred process according to the invention in comparison with a catalyst-coated membrane with a commercial Ir catalyst produced by a spraying method.

The diagram shown in FIG. 6 shows the electrocatalytic activity of a catalyst-coated membrane produced by the transfer method with a templateized mesoporous iridium oxide catalyst in comparison with a catalyst-coated membrane produced by a spray method with a commercial Ir catalyst. The membrane provided with a mesoporous catalyst layer via the transfer method achieves, with comparable geometric Ir loading, an Ir mass activity which is about 35% higher than that of the reference system. The same Pt/C catalyst which was applied via a spray process serves as cathode coating in both catalyst-coated membranes. The systems differ in the anode coatings.

The invention claimed is:

1. Method for producing a catalyst-coated polymer membrane for an electrolyser and/or a fuel cell comprising the following steps:
   a) Providing a glass-ceramic substrate;
   b) Synthesizing a mesoporous catalyst layer on the glass-ceramic substrate;
   c) Pressing a polymer membrane onto the glass-ceramic substrate coated with the catalyst layer at a first temperature $T_1$, thereby producing a sandwich structure;
   d) Separating the sandwich structure, wherein the catalyst layer is separated from the glass-ceramic substrate and adheres to the polymer membrane.

2. Method according to claim 1 characterised in that the glass-ceramic substrate is a vitreous carbon.

3. Method according to claim 1 characterised in that method step c) and method step d) are followed by the following method step: c1) cooling the sandwich structure to a second temperature $T_2$.

4. Method according to claim 1 characterised in that method step b) comprises the following steps:

(i) Preparing a suspension comprising a template, a metal precursor and a solvent;
(ii) Applying the suspension to the glass-ceramic substrate so that a suspension film forms on the glass-ceramic substrate;
(iii) Drying the suspension film on the glass-ceramic substrate at a temperature $T_4$ so that the solvent is evaporated within the suspension film and a layer of a catalyst precursor having integrated template structures is obtained;
(iv) thermal treatment of the glass-ceramic substrate comprising catalyst precursors at a third temperature $T_3$ and a calcination time $t_3$, so that a mesoporous catalyst layer is formed.

5. Method according to claim 4 characterised in that the temperature $T_2$ corresponds to a temperature below the glass transition point of the polymer membrane and the temperature $T_4$ is in a range between 18° C. and 80° C. and the temperature $T_3$ is in a range between 350° C. and 700° C., and the calcination time $t_3$ is in a range between 1 minute and 1440 minutes.

6. Method according to claim 5 characterised in that the temperature $T_3$ is in a range between 350° C. and 600° C.

7. Method according to claim 5 characterised in that the calcination time $t_3$ is 10 minutes.

8. Method according to claim 4 characterised in that the suspension comprises one or more amphiphilic block copolymers.

9. Method according to claim 8 characterised in that the amphiphilic block copolymer is selected from the group consisting of AB-Block Copolymeren (Polyethylenoxid-block-polystyrene (PEO-PS), Polyethylenoxid-block-polymethylmethacrylat (PEO-PMMA), Poly-2-venlypyridin-block-polyallylmethacrylat (P2VP-PAMA), Polybutadien-bock-polyethyleneoxid (PB-PEO), Polyisopren-bock-polydimethylaminoethylmetacrlyt (PI-PDMAEMA), Polybutadien-bock-polydimethylaminoethylmetacrlyt (PB-PDMAEMA), Polyethylen-block-polyethylenoxid (PE-PEO), Polyisobutylen-block-polyethylenoxid (PIB-PEO) und Poly (ethylen-co-buty-len)-block-poly (ethylenoxid) (PEB-PEO), Polystyrol-block-poly (4-vinylpyridin) (PS-P4VP), Polyisopren-block-polyethyleneoxid (PI-PEO), Polydimethoxyanilin-block-polystyrol (PDMA-PS), Polyethylenoxid-block-poly-n-utylacrylat (PEO-PBA), Polybutadien-bock-poly (2-vinylpyridin (PB-P2VP)), Polyethylenoxid-block-polylactid (PEO-PLA), Polyethylenoxid-block-polyglycolid (PEO-PLGA), Polyethylenoxid-block-polycaprolacton (PEO-PCL), Polyethylen-block-polyethylenglycol (PE-PEO), Polystyrol-block-polymethylmethacryt (PS-PMMA), Polystyrol-block-polyacrylsäure (PS-PAA), polypyrrol-block-polycaprolacton (PPy-PCL), Polysilicon-block-poly-etylenoxid (PDMS-PEO), ABA-Block Copolymeren (Poly-ethylenoxid-block-polybutadien-block-polyethylenoxid (PEO—PB-PEO), Polyethylenoxid-block-polypropyl-enoxid-block-polyethylenoxid (PEO—PPO-PEO), Polypropylenoxid-block-polyethylenoxid-block-polypropylenoxid (PPO-PEO-PPO), Polyethylenoxid-block-polyisobutylen-block-polyethylenoxid (PEO—PIB-PEO), Polyethylenoxid-block-polybutadien-block-polyethylenoxid (PEO—PB-PEO)), Polylactid-block-polyethylenoxid-block-polylactidd (PLA-PEO-PLA), Polyglycolid-block-polyethylenoxid-block-polyglycolid (PGLA-PEO-PGLA), Polylactid-co-caprolacton-block-polyethylenoxid-block-polylactid-co-caprolacton (PLCL-PEO-PLCL), Polycaprolacton-blockpolytetrahydrofuran-blockpolycaprolacton (PCL-PTHF-PCL), Polypropylenoxid-block-Polyethylenoxid-block-polypropylenoxid (PPG-PEO-PPG), Polystyrol-block-polybutadien-block-polystyrol (PS—PB—PS), Polystyrol-block-polyethylen-ran-butylen-block-polystyrol (PS-PEB-PS), Polystyrol-block-polyisopren-block-polystyrol (PS—PI—PS), ABC-Block Copolymeren (Polyisopren-block-polystyrol-block-polyethyleneoxid (PI—PS-PEO), Polystyrol-block-Polyvinylpyrrolidon-block-polyethyleneoxid (PS—PVP-PEO), Polystyrol-block-poly-2-venylpyridin-block-polyethylenoxid (PS-P2VP-PEO), Polystyrol-block-poly-2-venylpyridin-block-polyethylenoxid (PS-P2VP-PEO), Polystyrol-block-polyacrylsäure-polyethylenoxid (PS-PAA-PEO)), and Polyethylenoxid-block-polylactid-block-decan (PEO-PLA-decan).

10. Method according to claim 4 characterised in that metal salt or a plurality of metal salts of different metals in each case, or hydrates thereof, are used as the metal precursor.

11. Method according to claim 10 characterised in that the metal salts are selected from the group consisting of metal nitrate, metal halide, metal sulfate, metal acetate, metal citrate, and metal alkoxide.

12. Method according to claim 11 characterised in that the metals contained in the metal precursor are selected from the group consisting of alkali metals, alkaline earth metals, metals of the third main group of the periodic table, metals of the fourth main group of the periodic table, metals of the fifth main group of the periodic table, and transition metals.

13. Method according to claim 4 characterised in that water or a C1-C4 alcohol, C2-C4 ester, C2-C4 ether, formamide, acetonitrile, acetone, tetrahydrofuran, benzyl, toluene, dimethyl sulfoxide, dichloromethane, chloroform or mixtures thereof, are used as solvents.

14. Method according to claim 13 characterised in that methanol, ethanol, formamide, tetrahydrofuran or mixtures thereof are used as solvents.

15. Method according to claim 1 characterised in that the temperature $T_1$ is in a range between 80° C. and 800° C.

16. Method according to claim 15 characterised in that the temperature $T_1$ is in a range between 200° C. and 600° C.

17. Method according to claim 16 characterised in that the temperature $T_1$ is at 400° C.

18. Method according to claim 1 characterised in that the polymer membrane is pressed onto the glass-ceramic substrate coated with the catalyst layer with a contact pressure $p_1$ in a range from 100 N/cm$^2$ to 10,000 N/cm$^2$ and a time $t_1$ in a range from 5 s to 300 min.

19. Method according to claim 18 characterised in that the contact pressure $p_1$ in a range from 1000 N/cm$^2$ bis 3000 N/cm$^2$ and the time $t_1$ is in the range from 5 min to 60 min.

* * * * *